US010486071B2

(12) United States Patent
Yokoyama et al.

(10) Patent No.: US 10,486,071 B2
(45) Date of Patent: *Nov. 26, 2019

(54) GAME SERVER AND SCENARIO CONTROL PROGRAM

(71) Applicant: SQUARE ENIX CO., LTD., Tokyo (JP)

(72) Inventors: Ayako Yokoyama, Tokyo (JP); Naoki Yoshida, Tokyo (JP); Jin Fujisawa, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 15/834,786

(22) Filed: Dec. 7, 2017

(65) Prior Publication Data

US 2018/0093190 A1    Apr. 5, 2018

Related U.S. Application Data

(63) Continuation of application No. 14/584,399, filed on Dec. 29, 2014, now Pat. No. 9,868,064, which is a
(Continued)

(30) Foreign Application Priority Data

Dec. 2, 2010  (JP) ................................ 2010-268903

(51) Int. Cl.
*A63F 9/00*    (2006.01)
*A63F 13/795*    (2014.01)
(Continued)

(52) U.S. Cl.
CPC ............ *A63F 13/795* (2014.09); *A63F 13/10* (2013.01); *A63F 13/12* (2013.01); *A63F 13/35* (2014.09);
(Continued)

(58) Field of Classification Search
None
See application file for complete search history.

(56) References Cited

U.S. PATENT DOCUMENTS 6,336,861 B1    1/2002 Konoe et al.
6,500,070 B1    12/2002 Tomizawa et al.
(Continued)

FOREIGN PATENT DOCUMENTS

JP    2010-082310    4/2010

OTHER PUBLICATIONS

Dengeki PSP, Japan, Media Works Inc. Jun. 1, 2007, vol. 13 No. 20, pp. 54-61.
(Continued)

*Primary Examiner* — Seng Heng Lim
(74) *Attorney, Agent, or Firm* — Greenblum & Bernstein, P.L.C.

(57) ABSTRACT

In a game server wherein a player can play a game online by operating a game terminal, and game program has two or more partial scenarios and the partial scenario has an event to be played by forming a party through two or more players, a unifier that unifies and controls scenario proceeding of the player as a challenger, a controller that controls to prohibit the unified player from executing another events, a processor that does a procedure corresponding to clearing on the player as the challenger to whom clearing of the event was judged, and a releaser that releases unification of the player classified into the challenger are provided.

9 Claims, 4 Drawing Sheets

Related U.S. Application Data continuation of application No. 13/289,572, filed on Nov. 4, 2011, now Pat. No. 8,968,097.

(51) Int. Cl.
    *A63F 13/847*     (2014.01)
    *A63F 13/822*     (2014.01)
    *A63F 13/35*     (2014.01)
    *A63F 13/40*     (2014.01)
    *A63F 13/30*     (2014.01)

(52) U.S. Cl.
    CPC .......... *A63F 13/822* (2014.09); *A63F 13/847* (2014.09); *A63F 2300/407* (2013.01); *A63F 2300/5533* (2013.01); *A63F 2300/5566* (2013.01); *A63F 2300/634* (2013.01); *A63F 2300/807* (2013.01)

(56) References Cited

U.S. PATENT DOCUMENTS

| | | | |
|---|---|---|---|
| 6,669,562 B1 | 12/2003 | Shiino | |
| 6,676,521 B1 | 1/2004 | La Mura et al. | |
| 7,731,591 B2 | 6/2010 | Yamada et al. | |
| 8,272,953 B2 | 9/2012 | Fujisawa | |
| 2003/0109297 A1 | 6/2003 | Fukutome | |
| 2004/0106456 A1 | 6/2004 | Yamada et al. | |
| 2004/0152520 A1 | 8/2004 | Shinoda | |
| 2005/0119050 A1 | 6/2005 | Suzuki | |
| 2005/0197187 A1 | 9/2005 | Mitsuyoshi et al. | |
| 2006/0003824 A1 | 1/2006 | Kobayashi et al. | |
| 2006/0068905 A1 | 3/2006 | Umezaki | |
| 2006/0100020 A1 | 5/2006 | Kasai | |
| 2006/0116186 A1 | 6/2006 | Sawada et al. | |
| 2006/0223602 A1 | 10/2006 | Hanamoto | |
| 2007/0087798 A1 | 4/2007 | McGucken | |
| 2007/0254741 A1 | 11/2007 | Lim et al. | |
| 2008/0153596 A1 | 6/2008 | Nguyen | |
| 2009/0098940 A1 | 4/2009 | Sangberg | |
| 2009/0325712 A1 | 12/2009 | Rance | |
| 2011/0190063 A1 | 8/2011 | Kajii | |
| 2012/0015748 A1 | 1/2012 | Osada | |

OTHER PUBLICATIONS

Dengeki PlayStation, Japan, Media Works Inc. Mar. 9, 2007, vol. 13 No. 11, pp. 10-31.

GAME SERVER AND SCENARIO CONTROL PROGRAM

CROSS-REFERENCE TO RELATED APPLICATION

This is a continuation application of U.S. patent application Ser. No. 14/584,399, filed Dec. 29, 2014, which is a continuation application of U.S. patent application Ser. No. 13/289,572, filed Nov. 4, 2011 and now U.S. Pat. No. 8,968,097, which claims the benefit of Japanese Patent Application No. 2010-268903, filed on Dec. 2, 2010. The disclosure of each of the above-identified applications, including the specification, drawings, and claims, is incorporated herein by reference in its entirety.

TECHNICAL FIELD

This invention relates to a game server through which many players connected via a communication line can enjoy a game online and player control program proper for use in the device (gamer server computer).

BACKGROUND ART

Recently, so-called MMORPG (Massively Multiplayer Online Role-Playing Game) for enjoying a role-playing game in a virtual space set in a game server with which many players are connected through a communication line is now widespread.

In such a recent RPG (role-playing game), following structure is proposed. That is, two or more game apparatuses are connected and at the time of a specific event, a battle with boss, for example, in a scenario that some player is executing, players of another apparatuses are invited to participate and the event is executed by a cooperation of two or more players (Patent related document 1 shown below, for example).

PRIOR ART

[Patent related document 1]: Japanese patent application publication No.2010-82310

Such an inclination also appears in MMORPG, and in a battle with boss where a strong enemy is an opponent, the players who are acquainted with each other in a game space constructed in a virtual space in the game server execute a scenario (event) of the battle with boss in cooperation with another players by forming a party.

Problems to be Solved by Invention

In a conventional MMORPG, proceeding of a scenario is controlled such that an operation character to be operated by a player can freely act in a virtual space of a game server with no hindrance by another players, extremely improving a degree of freedom in the individual player's act-. Therefore, even in an event, such as a battle with boss to be played in cooperation with another players, its clear flag (that is an evidence of clearing (finishing) of the battle with boss) is given to only one person of two or more players who participated in the battle with boss (for example, only operation character to be operated by the player who has a leader flag that is determined among the players participating in the battle with boss in advance).

In such a control, it is necessary to repeatedly execute the event many times changing the leader in order to obtain the flag of clearing the event for all payers who participated in the battle with boss (event), and the time is vain and funs of the game are widely damaged thereby.

An object of the invention is to provide a game server and scenario control program wherein the players having participation qualification can obtain an equal outcome in one-time play at the time of execution of an event for which the cooperation play through two or more players is necessary in an online game, such as a MMORPG, maintaining the degree of freedom of the individual player.

Means for Solving Problems

A first aspect of the invention is a game server connected with many game terminals (1A, 1B, 1C, . . . ) through a communication line (2), through an operation of said game terminal by each player, said player can play a game online according to a predetermined game program of said game server (3) by operating his (her) own operation character in a virtual space in said game server (3), said game program having a game scenario which is comprised of two or more partial scenarios therein, said partial scenarios being controlled to be executed in predetermined orders, at least one partial scenario of said partial scenarios having an event to be played by forming a party through two or more players; said game server comprising:

a category classifier (9) that classifies said players comprising said party into challengers (SR, R) who have not yet cleared said event and observers (CA) who have already cleared said event by referring to player information regarding said players stored in a memory;

a unification processor (9) that unifies scenario proceedings of said players who were classified into said challengers and controls said scenario proceedings regarding these players as a unit;

an event execution controller (9) that controls to prohibit said player classified into the challenger from executing events excluding ones to be cleared as said challenger;

a clear judger (9) that judges whether or not said player classified into said challenger has cleared said event to be cleared as said challenger;

a clear event processor (9) that does a procedure corresponding to clearing of the event on said player classified into said challenger to whom clearing of the event has been judged through said clear judger;

a player information updater (9) that updates said player information of said player classified into the challenger who has cleared said event into contents when clearing said event; and a unification releaser (9) that releases said unification of said player classified into the challenger.

A second aspect of the invention is the game server, wherein at least one partial scenario in which said event is set has two or more sub scenarios (C1 through C10) to be executed by said player at an optional point of time in optional orders in the partial scenario, and said event is set in said sub scenario.

A third aspect of the invention is the game server, further comprising a notice receiver (9, 12) that receives a party formation notice from said two or more players, wherein said category classifier classifies and determines said players to whom said party formation notice was outputted.

Effects of Invention

The unification processor (9) unifies scenario proceedings of the players classified into the challengers and controls the scenario proceedings of these players as a unit. After clearing the event, the clear event processor (9) does a procedure corresponding to clearing of the event on the player as the challenger who was judged to have cleared the event. By doing so, the scenarios of all players as the challengers proceed as a unit and the procedures corresponding to clearing of the event are done as a unit. As the result, when executing the event for which cooperation play by two or more players is necessary, the participant players can equally obtain the result by one-time play at the time of the cooperation play, maintaining degree of free of each player.

The number in parentheses shows the corresponding element in the drawings for the sake of convenience, accordingly, the descriptions are not restricted and bound by the descriptions on the drawings.

PREFERRED EMBODIMENT

An embodiment of the invention is now explained, referring to appended drawings.

Figure 1:
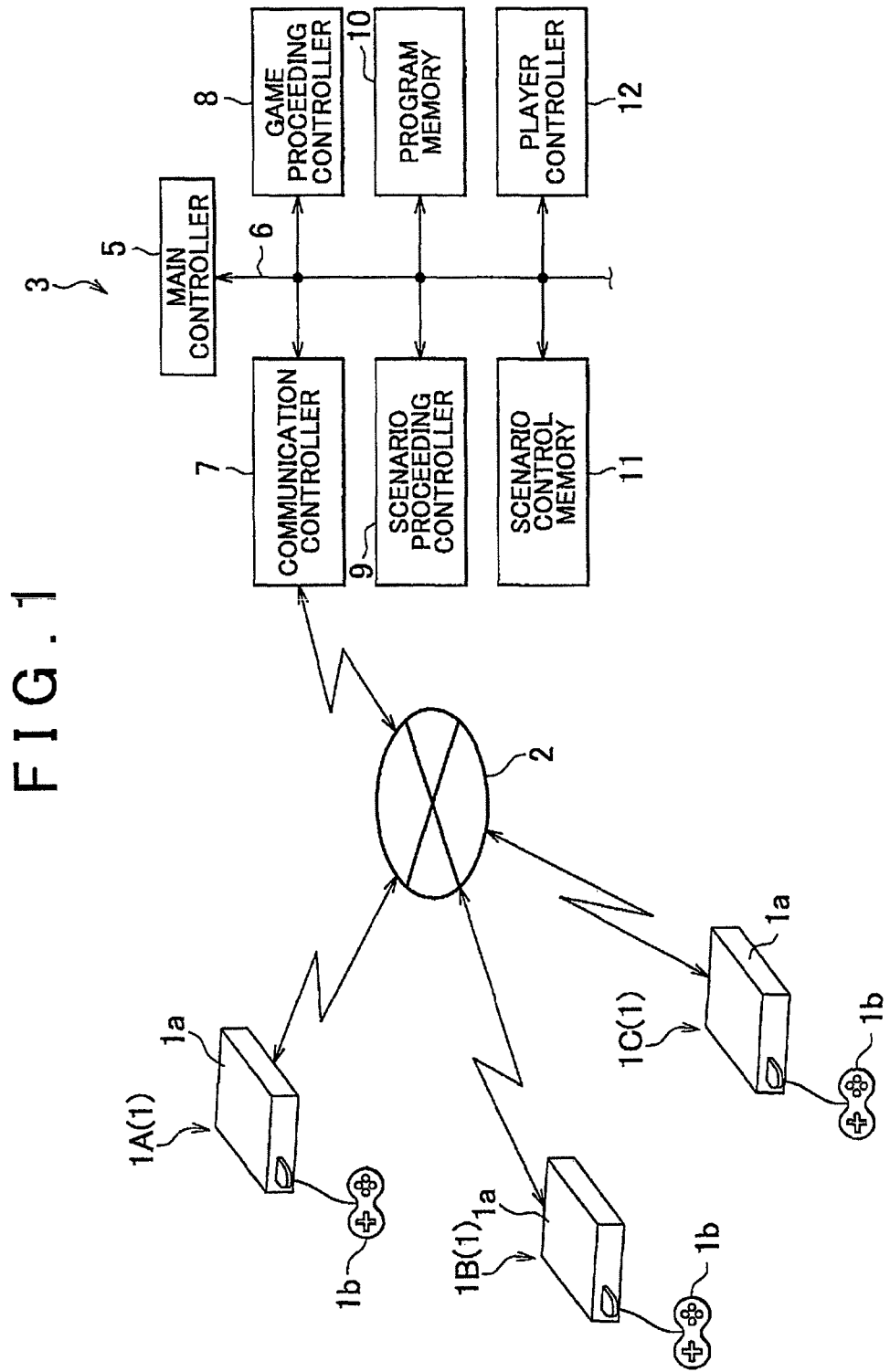
FIG. 1 is a control block diagram showing game terminals and a game server to which the invention is applied.

FIG. 1 shows two or more game terminals 1A, 1B, 1C . . . (Actually, extremely many game terminals 1 exist although the figure exemplarily shows only three game terminals 1) and a game server 3 connected with the game terminals 1A, 1B, 1C via a public communication line 2, such as the Internet and a public telephone net. Each of the game terminals 1A, 1B, 1C . . . has a main body 1a building a computer therein and a controller 1b as an input device is connected with the main body 1a.

The game server 3 as the game server computer has a main controller 5, and a communication controller 7 connected with the public communication line 2, a game proceeding controller 8, ascenario proceeding controller 9, a program memory 10 for storing game program of MMORPG, a scenario control memory 11 and a player controller 12 are connected with the main controller 5 via a bus line 6. FIG. 1 exemplarily shows only portions pertinent to the invention, but does not show the whole structure of an actual game server 3.

The game server 3 as shown in FIG. 1 executes functions shown in respective blocks as shown in FIG. 1 in such a manner that a computer reads and executes game program stored in a memory, such as the program memory 10 and the other well-known control program so that a CPU or a memory (not shown) time-dividedly operates by multitask. But, it is also possible to structure the game server 3 by hardwares corresponding to the respective blocks. Otherwise, it is also possible to control each block by a CPU or a MPU dispersedly provided in each block.

The game terminals 1 and the game server 3 have the above-mentioned structures. In order to play an online game, such as a MMORPG for players, each player operates his (her) own game terminal 1 so as to connect with the game server 3 through the public communication line 2, and executes the game in such a manner that the player operates to move an operation character that is set corresponding to each player in a virtual space formed in a memory in the game server 3 so that the operation character take an action according to a predetermined scenario controlled by the game server 3. The game program executed by the game server 3 is stored in the program memory 10 in the game server 3, and domain controls in the online game by executing through the game server 3. In each game terminal 1, the game program for controlling the terminal for executing a desired online game is stored in a predetermined memory by connecting with the game server 3.

Figure 2:
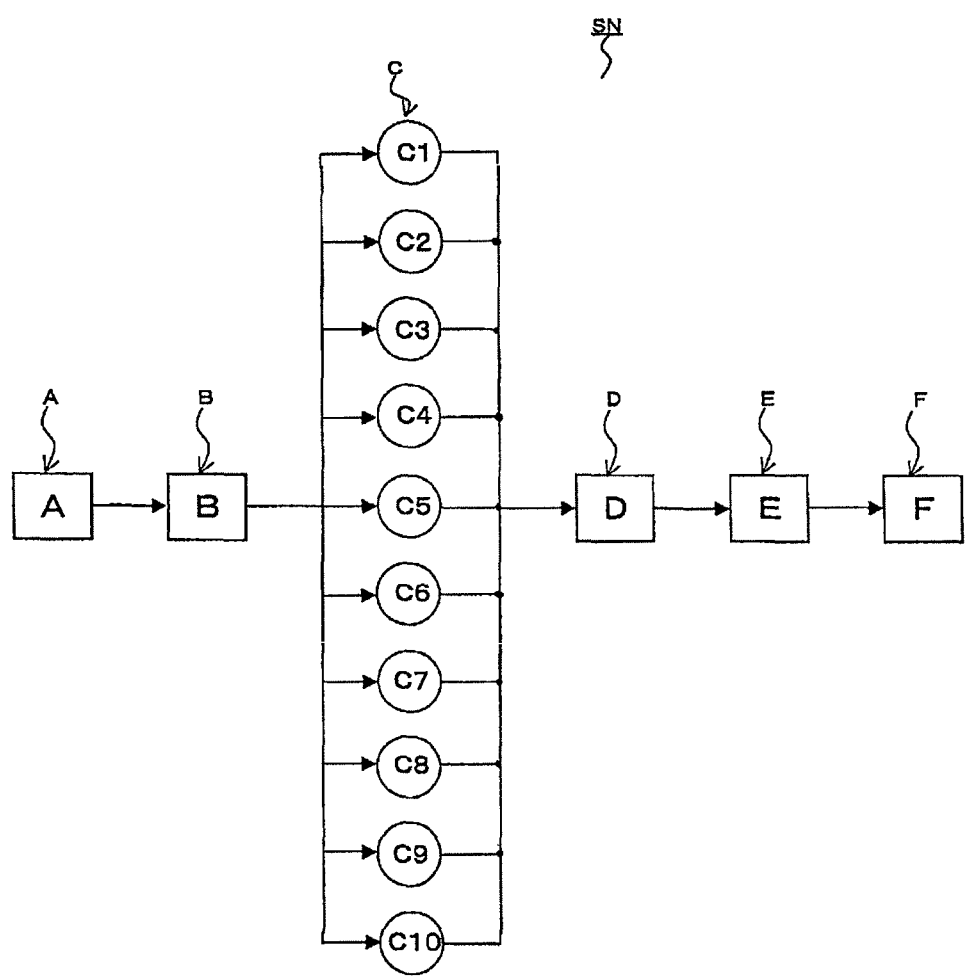
FIG. 2 is a view that shows an example of a structure of a game scenario to be provided through the game server.

Game scenario SN set in the game program is comprised of a partial scenario "A", a partial scenario "B", a partial scenario "C", a partial scenario "D", a partial scenario "E", and a partial scenario "F", as shown in FIG. 2. Each player is controlled to execute the partial scenarios A, B, C, D, E and F in these orders through the game proceeding controller 8. But, the partial scenario "C" hasten sub scenarios C1 through C10 in parallel, and each player can execute the sub scenario at an optional point of time in an optional order in the partial scenario C. The scenario proceeding controller 9 watches an execution state of the sub scenario in the partial scenario "C" every each player and the player controller 12 controls the execution state of sub scenario C1 through C10 of each player, that is, a clearing state in the scenario control memory 11 every each player.

In each of the sub scenarios C1 to C10 of the partial scenario "C", a battle with boss is lastly set as an event after a predetermined scenario development. Unless each player beats a boss that is set in the sub scenario after participating in the battle with boss, clearing of the sub scenario is not judged. The scenario proceeding controller 9 sets such an event, the battle with boss, as a cooperation play to be done by cooperation through two or more players. In order to clear the sub scenario, it is necessary for each player to contact with the operation character to be operated by another player in the virtual space in the game server and to find a partner who will fight together in the battle with boss.

That is, the player who plays an online game in the virtual space of the game server through the operation of each game terminal 1 gets the operation character operated by his (her) own to freely move and act in the virtual space so that the player can play the scenario fit for his (her) own favorites, and the game program generally controls that such actions can be executed by the operation character to be operated by each player alone. But, in the sub scenarios C1 to C10 comprising the partial scenario "C", the battle with boss (event) is set in each of the sub scenarios C1 to C10 and the scenario proceeding controller 9 controls according to the game program that in the sub scenario Cx two or more players should act cooperating with each other by forming a party so as to execute and clear the battle with boss (event) (this is referred to as only "execution of cooperation game").

Then, each player contacts with the operation character operated by another player in the virtual space in the game server through proper means, and finds partners who will fight together in the battle with boss, that is, who will play the cooperation game in order to form a party for participation in the battle with boss. If the partner who will fight together in the battle with boss is found and the party is formed, the player who participates in the party outputs a party formation notice from each game terminal 1 to the game server 3 through the public communication line 2. The party formation notice is received by the scenario proceeding controller 9 and the player controller 12 in the game server 3 that are receivers of such a notice and corresponding procedures are done according to the game program.

Figure 4:
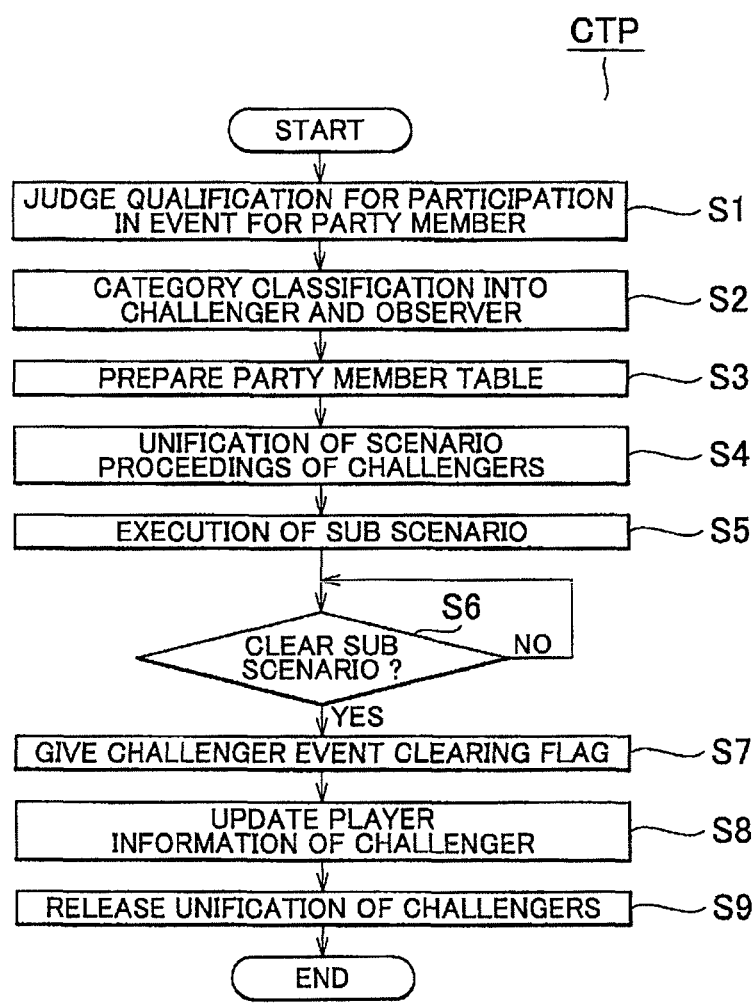
FIG. 4 is a flowchart that shows an example of cooperation play processing program during game program.

Receiving this, the game program starts event execution procedures in the cooperation play according to cooperation play processing program CTP that comprises a part of the game program. The cooperation play processing program CTP reads player information of members of the formed party out of a memory (not shown) through the player controller 12 based upon player ID of the members comprising the party shown in the party formation notices that was transmitted from the respective game terminals 1, as shown in FIG. 4. And, whether or not the members of the party that was formed this time have participation qualification for the participation in the battle with boss (event) to be executed from now on that is stored in the party formation notice as attribution data is judged. In order to execute the partial scenarios C1 through C10 and to fight in the battle with boss that is the event set for clearing, it is necessary for all players comprising the party members to clear the partial scenarios A and B. This is because in order to prevent a failure of the scenario proceeding of the whole game program, the game proceeding controller 8 controls not to execute the partial scenario C unless the player clears the partial scenarios A and B. Even if the player who has already cleared the partial scenario C and proceeded to the partial scenario D or later, there may be a danger of failure of the scenario proceeding. Then, the execution of the partial scenario C by the player is restricted by the game proceeding controller 8.

After judging the existence of the event participation qualification for all players (members) comprising the party in step S1, the program proceeds to Step S2 of the cooperation play processing program CTP and the scenario proceeding controller 9 reads a state of event attainment of each of the players comprising the party members shown in the party formation notice out of a memory (not shown) so as to determine a category of each player in the event that the party tries to execute this time. In the category of the player, the players are classified into the players who have not yet cleared the event to be executed by the party this time and the players who have already cleared such an event, and the player who have not yet cleared is classified into a category of challenger PC1 and the player who have already cleared is classified into a category of observer PC2.

Subsequently, the cooperation play processing program CTP proceeds to Step S3, and the scenario proceeding controller 9 processes so as to prepare a party member table PMT in the scenario control memory 11. As already mentioned above, it is possible to easily read the state of event attainment of each player since a memory (not shown) in the game server 3 stores the states of attainment (clearing) of the respective partial scenarios (events) A to F and the states of attainment (clearing) of the respective sub scenarios (events) C1 to C10 of the partial scenario C for all players accessible to the game server 3 as player information together with the player ID.

Figure 3:
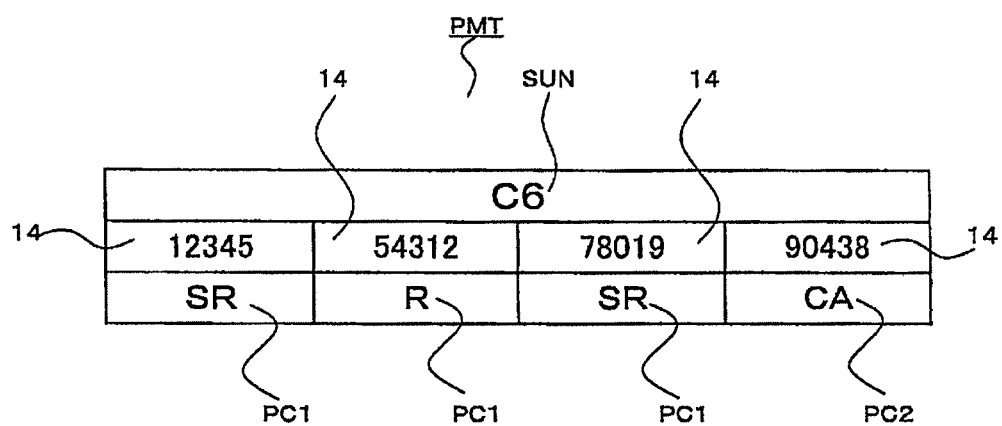
FIG. 3 is a typical view that shows an example of a party member

That is, the scenario proceeding controller 9 prepares the party member table PMT in the scenario control memory 11 as shown in FIG. 3, and the party member table PMT stores sub scenario name SUN of the event that will be executed from now on by the party shown in the party formation notice, the player ID 14 of the player comprising the party, and the challenger PC1 and the observer PC2 as the categories of the players. The challenger PC1 is further classified into "R" that shows a leader and "SR" that shows a sub leader, and the observer PC2 is shown as "CA" and "CA" is stored. The leader and sub leader that are categories of the challenger PC1 show the players who have not yet cleared the sub scenario event that the party will execute from now on, and the observer PC2 is the player who has already cleared the sub scenario event (but, has not yet proceed to the partial scenario D or later. The players that comprise the party members can determine the leader and the sub leader upon deliberation and the leader and the sub leader are shown as the attribution data of the party formation notice transmitted from each game terminal 1 to the game server 3. And, the scenario proceeding controller 9 judges whether the player is the challenger or the observer by referring to the above-mentioned player information.

After thus preparing the party member table PMT, the scenario proceeding controller 9 does a procedure for unifying the scenario proceeding in connection with the challengers in Step S4 of the cooperation play processing program CTP for the players that are classified into the categories of the leader and the sub leader of the party member table PMT, that is, for the players who are regarded as the challengers. The scenario proceeding controller 9 controls the players whose scenario proceeding has been unified in such a manner that the respective players comprising the unit take actions as a unit and the action outcome can be equally distributed to the leader and the sub leader comprising the unit until the unification is released.

Concretely speaking, the scenario proceeding controller 9 controls such that the event of the sub scenario Cx (x=one of 1 to 10) to be executed from now on that has notified the game server 3 by the player who is the challenger (the operation character) through the party formation notice, that is, the event of the sub scenario Cx to be cleared as the challenger is fixedly set as the scenario (event) to be executed by the challenger and the executions of the other sub scenarios (events) and the partial scenarios D through F after the partial scenario C are prohibited to be executed. No unification of the scenarios is done and no action control in connection with the scenario proceeding is done for the player who was classified into the category of "observer" who has already cleared the sub scenario Cx, for example, for the player whose ID is "90438" in FIG. 3.

The players who thus formed the party (referred to as "party player") enter Step S5 of FIG. 4, and start to execute the sub scenario shown in the formation notice, for example, the sub scenario C6 and fight in the battle with boss set in the sub scenario C6.

The scenario proceeding controller 9 judges whether the party player cleared the sub scenario C6 or not in Step 56 of the cooperation play processing program CTP. If the clearing of the sub scenario C6 was judged, the program proceeds to Step S7, and a clear flag of the sub scenario C6 is given to all players who have been classified into the challengers of the party players as a lump. On this occasion, the clear flag is not given to the players who have classified into the observers since such players have already cleared the sub scenario C6 (on control, such a procedure is optional, the procedure that no clear flag is given to the players who have classified into the observers or the procedure that the clear flag is given to all, but the clear flag is not finally given to the player who has already cleared the sub scenario C6 since it means overwrite of the clear flag). At this time, distribution of an experience value due to the clearing of the sub scenario C6 is equally done to all party players, and there is no difference between the challenger and the observer.

After giving the clear flag to the leader ad the sub leader that are the challengers, the scenario proceeding controller 9 enters Step S8 of the cooperation play processing program CTP, and the player information stored in the memory (not shown) in the game server 3 is updated for the players of the challengers, and the clear flag showing the clearing of the sub scenario C6 by such players is written in the memory. By doing so, one-time execution of the sub scenario C6 by the leader and the sub leader who were unified challengers means all persons comprising the unit have cleared the sub scenario C6. The player information of the player as the observer is not changed after update since the player is considered to have cleared the sub scenario C6.

Subsequently, the scenario proceeding controller 9 enters Step S9 and does the procedure of releasing the unification in the scenario proceeding unified in Step S4. This is done by deleting party member table PMT in connection with the party members that have been prepared in the scenario control memory 11. With such a procedure, the unification of the leader and the sub leader who are the challengers is released and the limitation of the scenario proceeding is released for each player who has been the challenger, so that the scenario proceeding controller 9 controls each player can execute the optional sub scenario Cx and the partial scenarios D through F which have not yet been executed. No procedure is done for the player who has been "the observer" since no limitation on execution of the scenario is originally given to such a person.

Receiving this, the scenario proceeding controller 9 returns the scenario proceeding of each player who was the party member to a normal scenario proceeding. By doing so, each player who was the party member can take actions alone freely in the virtual space in the game server 3 and execute the optional partial scenarios C through F by operating his (her) own operation character through each game terminal 1.

In the above-mentioned embodiment, the leader and sub leader comprising the challengers are determined among the players comprising the party members upon deliberation, but the scenario proceeding controller 9 of the game server 3 can automatically determine the leader and the sub leader by referring to the state of clearing of the sub scenario of each player through the player information in the memory (not shown) with no deliberation between the players.

Besides, the partial scenario to be done through the party formed by two or more players in cooperation with these players is not always the partial scenario having the sub scenarios, but the cooperation play may be done when executing the partial scenario on which no sub scenario is set.

What is claimed is:

1. A game server connected with a plurality of game terminals through a communication network, each game terminal executing an online game according to a game program of the game server through an operation of a player, each game terminal operating an operation character in a virtual space in the game server, the game program including a plurality of events, at least one of the plurality of events having a specific event configured to be played by at least one character included in a party, the game server comprising:
   a processor; and
   a memory including the game program that, when executed by the processor through the operation of each game terminal, causes the processor to perform operations including:
      forming the party of at least two characters;
      determining a leader of the party;
      changing a state of the party or the characters when the leader is changed;
      prohibiting at least one of the characters included in the party from executing an event other than the specific event of the plurality of events until the party is released;
      giving a clear flag of the specific event to the leader when the processor judges that the specific event is cleared; and
      releasing the event other than the specific event to the at least one of the characters prohibited from executing the event other than the specific event when the processor judges that the party has been released.

2. The game server according to claim 1, wherein
   the plurality of events is to be cleared in a predetermined order, and
   the party is formed on a basis of a participation-condition to the specific event relating to the predetermined order being satisfied.

3. The game server according to claim 1, wherein the operations further include:
   judging whether or not at least one of the at least two characters included in the party has cleared the specific event;
   executing a process corresponding to clearing of the specific event for all of the at least two characters included in the party when the processor judges that the specific event has been cleared; and
   updating player information of all of the at least two characters included in the party for which the specific event has not been judged as being cleared into a status having the specific event being judged cleared when the processor judges that the specific event has been cleared.

4. The game server according to claim 1, wherein the memory further includes a party member table, the party member table identifying each character of the at least two characters included in the party in association with a category which indicates whether the character is prohibited from executing the event other than the specific event until the party is released or allowed to execute the event other than the specific event before the party is released.

5. The game server according to claim 4, wherein
   the category is selected from among categories including a challenger and an observer,
   the category of challenger indicates that the character is prohibited from executing the event other than the specific event until the party is released,
   the category of observer indicates that the character is allowed to execute the event other than the specific event before the party is released,
   a state of event attainment of each character which is associated with the category of challenger is not yet cleared, and
   the state of event attainment of each character which is associated with the category of observer is cleared.

6. The game server according to claim 5, wherein the party member table includes a single entry for the specific event, with each of the at least two characters included in the party and the associated category of each character being unified with the single entry for the specific event.

7. A non-transitory computer readable medium storing a game program in a game server, the game server connected with a plurality of game terminals through a communication network, each game terminal executing an online game according to the game program of the game server through an operation of a player, each game terminal operating an operation character in a virtual space in the game server, the game program including a plurality of events, at least one of the plurality of events having a specific event configured to be played by at least one character included in a party, the game program causing the game server to perform operations including:

forming the party of at least two characters;
determining a leader of the party;
changing a state of the party or the characters when the leader is changed;
prohibiting at least one of the characters included in the party from executing an event other than the specific event of the plurality of events until the party is released;
giving a clear flag of the specific event to the leader when the processor judges that the specific event is cleared; and
releasing the event other than the specific event to the at least one of the characters prohibited from executing the event other than the specific event when the processor judges that the party has been released.

8. A non-transitory computer readable medium storing a game program for execution by a computer, the computer configured to be connected with a game server, the game server connected with a plurality of game terminals through a communication network, each game terminal executing an online game according to the game program through an operation of a player, each game terminal operating an operation character in a virtual space in the game server, the game program including a plurality of events, at least one of the plurality of events having a specific event configured to be played by at least one character included in a party, the game program causing the computer to perform operations including:

forming the party of at least two characters;
determining a leader of the party;
changing a state of the party or the characters when the leader is changed;
prohibiting at least one of the characters included in the party from executing an event other than the specific event of the plurality of events until the party is released;
giving a clear flag of the specific event to the leader when the processor judges that the specific event is cleared; and
releasing the event other than the specific event to the at least one of the characters prohibited from executing the event other than the specific event when the processor judges that the party has been released.

9. A game system including a game server and a plurality of computers, the game server connected with a plurality of game terminals through a communication network, each game terminal executing an online game according to a game program of the game server through an operation of a player, each game terminal operating an operation character in a virtual space in the game server, the game program including a plurality of events, at least one of the plurality of events having a specific event configured to be played by at least one character included in a party, the game system comprising:

a processor; and
a memory including the game program that, when executed by the processor through the operation of each game terminal, causes the processor to perform operations including:

forming the party of at least two characters;

determining a leader of the party;

changing a state of the party or the characters when the leader is changed;

prohibiting at least one of the characters included in the party from executing an event other than the specific event of the plurality of events until the party is released;

giving a clear flag of the specific event to the leader when the processor judges that the specific event is cleared; and releasing the event other than the specific event to the at least one of the characters prohibited from executing the event other than the specific event when the processor judges that the party has been released.

* * * * *